United States Patent Office 3,341,614
Patented Sept. 12, 1967

3,341,614
PRODUCTION OF DETERGENT ALKYLATE
Max Marin Wirth and John Habeshaw, Dollar, Scotland, assignors to British Hydrocarbon Chemicals Limited, London, England, a British company
No Drawing. Filed Feb. 16, 1965, Ser. No. 433,171
Claims priority, application Great Britain, Feb. 25, 1964, 7,885/64; Feb. 28, 1964, 8,436/64, 8,437/64
15 Claims. (Cl. 260—671)

The present invention relates to the production of olefines.

According to the present invention the process for the production of an olefine comprises thermally decomposing an alkane sulphonic acid of the formula

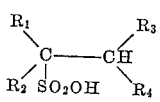

where $R_1$, $R_2$, $R_3$ or $R_4$ are hydrogen, alkyl or aryl radicals, or where $R_1$ or $R_2$ together with $R_3$ or $R_4$ form part of a cyclo-aliphatic ring.

Suitable starting materials for the process include the sulphonic acids of paraffins having from 4 to 20 carbon atoms in the molecule or mixtures of any of these paraffins. Sulphonic acids of higher paraffins, and of cyclo-aliphatic compounds such as cyclo-hexane, methylcyclo-hexane, and cyclo-pentane can also be used. Preferred starting materials include the sulphonic acids derived from normal paraffins in the $C_6$ to $C_{20}$ range, cyclohexane and methyl cyclohexane, although others can be used.

The alkane sulphonic acids may be prepared by any of the conventional methods, for example by sulphoxidation of the corresponding paraffin or cycloparaffin and the crude sulphoxidation product may be used directly as starting material. Other known methods such as the reaction of alkyl halides with alkali sulphite (Strecker reaction) may be used to prepare the sulphonic acid. The crude sulphoxidation products of paraffins and cyclo-paraffins usually contain sulphuric acid as well as the sulphonic acid, and it is preferred that the sulphonic acid be freed from the bulk of the sulphuric acid present before feeding to the decomposition step. However, the alkane sulphonic acids according to the present invention which have an aryl group as substituent are not conveniently prepared by conventional sulphoxidation.

Any of the known methods for separating sulphonic acids from sulphuric acid may be used for this purpose. It is preferred to feed the sulphonic acid to the process in the form of an aqueous solution.

The decomposition process is carried out by heating the alkane sulphonic acid to an elevated temperature for instance a temperature in the range 300–800° C. The decomposition may be effected under liquid or vapor phase conditions, but it is preferred to carry out the process under conditions where the hydrocarbon product is in the vapor phase. One method is to inject the liquid feed together with steam or inert gas heated to the appropriate temperature into a hot reaction zone, which may be empty or packed. Rapid heating of the liquid feed to the reaction temperature is an important feature and if the rate of heating is too small, tar formation is increased. If desired a gaseous diluent such as steam or nitrogen may be used in the vapor phase reaction. The process may be carried out if desired in the presence of a solid contact material, such as silica gel, and in this case reaction temperatures in the lower part of the stated range may be used.

The various forms of silica, of low surface area as well as high surface area silica gels can be used in the reactor, and low surface area aluminas are satisfactory. However, high surface area aluminas, such as activated alumina, have not proved very satisfactory, and if alumina is used for this purpose, the surface area should preferably not exceed about 10 sq. metres per gram.

Sulphur dioxide and water are formed as by-products of the reaction. The sulphur dioxide formed in the sulphonic acid decomposition may be recovered from the reaction products, and returned to the sulphoxidation reaction.

A particularly useful process according to the present invention is the production of an alkyl aryl compound from an aromatic hydrocarbon by alkylation, in the presence of an alkylation catalyst, with an olefine, the olefine being obtained from a paraffin by a method which comprises the steps of forming an alkane sulphonic acid of the formula

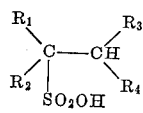

where $R_1$, $R_2$, $R_3$ and $R_4$ are hydrogen or alkyl radicals, and thermally decomposing the alkane sulphonic acid to obtain olefines and sulphur dioxide. Mono-alkyl aryl compounds in which the alkyl group has from 10–16 carbon atoms are particularly useful as they may be converted into detergents by sulphonation. The single compounds and their mixtures are referred to as detergent alkylate. The present invention allows straight chain alkyl aryl compounds to be prepared from normal paraffins, as unlike some known methods of converting paraffins to olefines, no skeletal isomerisation occurs on converting paraffins to olefines using the method of the present invention. The preparation of detergent alkylate fractions consisting mainly of relatively straight chain alkyl-benzenes, particularly those in which the alkyl chain length is about $C_{10}$ to $C_{17}$ has recently assumed considerable importance. These alkylbenzenes are used in the production of sulphonate detergents, which can be readily degraded by sewage bacteria, in contrast to the conventional highly branched-chain alkylbenzene sulphonates, derived for instance from propylene tetramer or propylene pentamer.

These straight chain alkylbenzenes having a chain length of 10 to 17 carbon atoms may be made by a process which comprises sulphoxidising a paraffin feedstock in the range $C_{10}$ to $C_{17}$ containing at least 95% of normal paraffins, to obtain alkane sulphonic acids, thermally decomposing the alkane sulphonic acids to obtain olefines and sulphur dioxide, and alkylating the olefines to an aromatic hydrocarbon in the presence of an alkylation catalyst.

Alternatively a paraffin feedstock in the $C_5$ to $C_8$ carbon number range containing at least 95% of normal paraffins is sulphoxidised to obtain alkane sulphonic acids, the alkane sulphonic acids are decomposed thermally to obtain normal olefines in the $C_5$ to $C_8$ carbon number range and sulphur dioxide, these $C_5$ to $C_8$ olefines are dimerised in the presence of a catalyst, and a fraction of the dimerisation product in the $C_{10}$ to $C_{16}$ carbon number range and comprising relatively straight chain olefines is alkylated to an aromatic hydrocarbon in the presence of an alkylation catalyst.

Instead of sulphoxidising paraffin feedstocks to convert them to alkane sulphonic acids, the paraffins may be chlorinated and the mono-chlorides converted to the alkane sulphonic acids of the present invention by the action of alkali sulphite. The chlorination should preferably be carried out so as to yield as high a proportion of mono-chlorides as possible, as polychlorides will give polysulphonic acids.

In the production of detergent alkylate from $C_{10}$ to $C_{17}$ paraffins the paraffin feedstock may be derived from straight run middle distillates from petroleum using for example molecular sieves or urea adduction to separate the normal paraffins. Limitations on the range of chain lengths of the paraffin fraction are not as important when producing detergent alkylate using the process of the present invention as in many known processes for making detergent alkylate. These limitations are only required when it is needed to separate unreacted paraffin which has been carried through to the alkylation step from the alkylated products. The use of a narrow paraffin fraction is then necessary to prevent overlap of boiling ranges between the products of the alkylation reaction and unreacted paraffin so enabling the paraffin to be separated by distillation. However in the process of the present invention when the paraffins have been converted to alkane sulphonic acids, the greater part of any unreacted paraffins may be readily separated from the sulphonic acid, which is water soluble. However if any unreacted paraffin is carried through to the alkylation step and it is desired to recover the paraffin for recycle, the feedstock should preferably contain paraffins the carbon numbers of which do not differ by more than 5 carbon atoms and more especially by more than 4 carbon atoms (e.g. $C_{10}$ to $C_{13}$; $C_{11}$ to $C_{14}$; $C_{12}$ to $C_{15}$). A $C_{10}$ to $C_{13}$ feedstock is particularly useful; here it will be understood that the presence of minor amounts of $C_9$ and $C_{14}$ hydrocarbons such as would arise in normal fractionations can be tolerated. Where the process includes an olefine dimerisation step, the paraffin feedstock may comprise any straight chain paraffin or mixture of paraffins containing from 5 to 8 carbon atoms in the molecule, and may be for example separated by molecular sieves or by urea adduction from a petroleum distillate fraction.

The sulphoxidation and thermal decomposition stages are carried out as described above. After separation from the sulphur dioxide and from the aqueous phase, the fraction of normal olefines recovered from the sulphonic acid decomposition is condensed by known methods with an aromatic hydrocarbon in the presence of a suitable alkylation catalyst, such as aluminum chloride or anhydrous hydrogen fluoride. The aromatic hydrocarbon may be for instance benzene, toluene, xylenes or naphthalenes; it is preferred to use benzene. The preferred alkylation catalyst is hydrogen fluoride, which gives low proportions of unwanted low boiling and high boiling products. The condensation is suitably carried out in the liquid phase at a temperature in the range $-20$ to $+100°$ C. The alkylation product after separation of the catalyst is fractionated to recover unreacted aromatic hydrocarbons for recycle, a small light alkylate fraction, and a distillate detergent alkylate fraction, leaving a small residue of heavy alkylate.

Where the process includes an olefine dimerisation step the normal olefine fraction recovered from the decomposition step reaction product is preferably purified from acidic, diolefinic and sulphur containing impurities which adversely affect the dimerisation catalyst life and activity, before being dimerised. The catalysts used in the dimerisation step are preferably transition metal oxide catalysts alone or supported on silica or preferably silica/alumina, but other catalysts may also be used, for instance Ziegler type polymerisation catalysts and synthetic petroleum cracking catalysts especially silica/alumina. With Ziegler type catalysts only the 1-olefines react, and a separate isomerisation of the internal olefines or addition of a component active for double bond movement to the Ziegler system is necessary to utilise all the olefines in the monomer. To obtain the highest yields of the liquid dimers based on the normal paraffin feed it is advisable to operate the dimerisation step at relatively low conversion. Temperatures in the range of $20-150°$ C. are preferred, and the reaction is desirably carried out under sufficient pressure to maintain the reactants in the liquid phase. An inert solvent, liquid under the reaction conditions, such as low ($C_5$) paraffin may be used if desired.

The olefinic product from the dimerisation step is suitably treated, preferably by fractional distillation, to separate a fraction containing olefines within the $C_{10}$ to $C_{16}$ carbon number range, but extending over a range of not more than 5 and preferably not more than 4 carbon atoms, for use in the alkylation reaction. Suitably the dimerisation product is first distilled to separate as distillate unpolymerised $C_5$ to $C_8$ olefines which can be recycled to the dimerisation stage. The product is then fractionated, preferably under reduced pressure, to separate as distillate the required fraction containing $C_{10}$–$C_{16}$ olefines.

The recovered dimer fraction is then alkylated by known methods to an aromatic hydrocarbon as described above.

The invention is further illustrated with reference to the following examples.

Example 1

An aqueous solution of pure cyclohexane sulphonic acid containing 15% of the acid was pumped through an empty tube of 10 cc. volume at a rate of 50 cc. per hour, the tube being maintained at a temperature of $500°$ C. About 19% of the sulphonic acid was decomposed to yield a crude hydrocarbon product consisting principally of cyclohexene, with small amount of benzene and methylcyclopentene.

Example 2

An aqueous solution of cyclohexane sulphonic acid containing 15% of the acid was pumped at 50 cc. per hour through an empty tube of 30 cc. volume maintained at a temperature of $550°$ C. The sulphonic acid was completely decomposed, giving an olefinic mixture containing 84% of cyclohexene; about 65 moles of cyclohexene per 100 moles of sulphonic acid fed were recovered from the reaction products.

Example 3

An aqueous solution of cyclohexane sulphonic acid containing 15% of the acid was passed over 30 ccs. of silica gel in a reactor tube maintained at $350°$ C. The aqueous solution was passed through the tube at 50 cc./hour, and 94% of the sulphonic acid was decomposed. The hydrocarbon product was separated, and found to contain 92% of cyclohexene, the main impurities being benzene and methylcyclopentene.

Example 4

An aqueous solution containing 14% of the sulphonic acid as well as some $H_2SO_4$ formed by sulphoxidation of normal hexane was passed through a tube containing 30 cc. of silica gel and held at temperature of $350°$ C. About 60% of the sulphonic acid was decomposed, giving about 80 moles per 100 moles of sulphonic acid decomposed of a mixture of normal hexenes. Gas chromatographic examination of this hydrocarbon product showed that it was practically entirely composed of hexene-1, hexene-2 and hexene-3, the mixture containing 22% of hexene-1, 23% of cis- and trans-hexene-3, and 55% of cis- and trans-hexene-2.

Example 5

An aqueous solution of the crude sulphonic acid made by sulphoxidation of n-decane was used as feed in this test. The solution contained 16% of sulphonic acids (calculated as having a mol. wt. of 222) but consisting of a mixture of mono- and disulphonic acid, and 4.6% of free sulphuric acid. This solution was pumped at a rate of 50 cc. per hour through an empty tube 30 ccs. in volume and maintained at a temperature of $550°$ C. About 68% of the sulphonic acid was decomposed, giving a hydrocarbon product containing about 90% of straight chain decenes, with some lower molecular weight hydrocarbons.

The yield of decenes was rather more than 80 moles per 100 equivalents of sulphonic acid decomposed, and 86 moles of sulphur dioxide per 100 equivalents of sulphonic acid decomposed were also recovered.

*Example 6*

Hexane-1 sulphonic acid was prepared by the reaction of 1-chlorohexane with sodium sulphite, and subsequent ion exchange treatment. A 10% solution of the free acid in water was fed at 50 cc. per hour to a reactor containing 30 cc. of silica gel and maintained at a temperature of 350° C. The sulphonic acid was 55% converted to olefines, the olefinic product containing 51% of hexene-1, 31% of hexene-2 and 9% of hexene-3.

*Example 7*

An aqueous solution containing 17.1% of sulphonic sulphonic acid was fed at 50 cc. per hour to a reactor containing 30 cc. of "Norton sphere" (a commercial, low surface area alumina based product) and maintained at a temperature of 350° C. After 5 hours on stream the products were analysed, showing that 77% of the cyclohexane sulphonic acid had been converted, the efficiency of formation of total hydrocarbon being 96% based on sulphonic acid consumed, and the efficiency of formation of cyclohexene being 79%. The yield of sulphur dioxide was 77% of theory based on sulphonic acid consumed.

*Example 8*

An aqueous solution containing 17.1% of sulphonic acids derived from the sulphoxidation of a normal paraffin mixture ranging from $C_{10}$–$C_{13}$, was fed at 50 cc. per hour to a reactor containing 30 cc. of silica gel maintained at 350° C. The conversion of sulphonic acids to other products was 90% and the efficiency of formation of mono-olefines in the $C_{10}$ to $C_{13}$ range was 90%, while the efficiency of sulphur dioxide formation was 82%. These yields were suprisingly high in view of the fact that, from the S and C analysis of the original sulphonic acids, these appeared to include about 20% of disulphonic acids.

*Example 9*

This example shows the preparation of a detergent alkylate by alkylating an aromatic hydrocarbon with an olefine obtained from a paraffin.

n-Decane was sulphoxidised to give an aqueous solution of the crude sulphonic acid containing 16% of mono- and disulphonic acids, and 4.6% of free sulphuric acid. This solution was pumped at a rate of 50 cc./hour through an empty tube 30 ccs. in volume and maintained at a temperature of 550° C. About 68% of the sulphonic acid was decomposed, giving hydrocarbon product containing about 90% of straight chain decenes, with some lower molecular weight hydrocarbons. The yield of decenes was rather more than 80 moles per 100 moles of sulphonic acid decomposed, and 86 moles of sulphur dioxide per 100 moles of sulphonic acid found were also recovered.

*Example 10*

This example shows the preparation of detergent alkylate by alkylating an aromatic hydrocarbon with an olefine obtained by dimerising an olefine obtained from paraffin.

Normal hexane was reacted with sulphur dioxide and oxygen in a sulphoxidation reaction to form hexane sulphonic acid. An aqueous solution containing 14% of the sulphonic acid as well as some sulphuric acid was passed through a tube containing 30 cc. of silica gel at a temperature of 350° C. About 60% of the sulphonic acid was decomposed, giving about 80 moles of mixed normal hexenes per 100 moles of sulphonic acid decomposed. Gas chromatographic examination of this hydrocarbon product showed that it was practically entirely composed of hexene-1 (22%) hexene-2 (55%) and hexene-3 (23%).

*Example 11*

This example illustrates the dimerisation of an olefine in the $C_5$–$C_8$ carbon number range using a silica/alumina catalyst.

Normal hexenes prepared as described from the sulphoxidation product of normal hexene were dimerised by pumping over a silica/alumina catalyst containing 87% of silica. The reaction was carried out in the liquid phase at a temperature of 60° C. and a pressure of 100 p.s.i.g. The hexenes were processed at a rate of 1 volume of liquid hexenes per volume of catalyst per hour, giving a conversion of hexenes to total polymer of 10% per pass. Of the total polymer formed in this run, 88% by weight was $C_{12}$ olefines, the remainder being higher polymer. Unconverted hexenes were recovered by continuous fractionation of the reactor effluent and recycled to the reactor: the residual hexene-free polymer was fractionated under reduced pressure to recover the $C_{12}$ olefin as distillate, leaving the heavy polymer by-product as a residue.

*Example 12*

This example illustrates the dimerisation of a normal paraffin in the $C_5$–$C_8$ carbon number range using a transition metal oxide catalyst.

A normal hexene feed was processed over a nickel oxide-silica-alumina catalyst prepared by impregnating silica-alumina (13% alumina) with nickel nitrate, decomposing the nitrate and finally activating the catalyst by heating in air at 550° C. The reaction was carried out at 80–90° C. with the hexenes in the liquid phase at a pressure of 400 p.s.i.g. An average conversion of about 20% hexenes to total polymer was obtained during 60 hours operation with a hexene flow rate of 1 volume per volume of catalyst per hour, about 85–90% of the total polymer being $C_{12}$ olefins. During this period the conversion declined, and the catalyst was regenerated at the end of the run by treating with air at 536° C. This treatment restored the catalyst activity (as measured by the hexene conversion) to the value obtained at the start of the test.

*Example 13*

This example illustrates the preparation of detergent alkylate by alkylation of an aromatic hydrocarbon with an olefin in the $C_{10}$–$C_{17}$ carbon number range.

Sufficient liquid anhydrous hydrogen fluoride was charged to a stirred reactor to give an HF/olefin mole ratio of 20:1. A mixture of benzene and normal dodecene having a benzene: olefin ratio of 10:1 was then added with vigorous agitation over a period of 60 minutes, the temperature being kept at 10–14° C., and stirring was continued for a further 30 minutes at the same temperature. The reaction mix was then settled for 15 minutes, and the HF phase drained off and measured. The hydrocarbon phase was measured and any residual HF neutralised by stirring with an excess of 25% weight aqueous potassium hydroxide. The aqueous phase was removed and the hydrocarbon phase water washed and dried. The dried hydrocarbon product was fractionated and the recovered benzene, light alkylate, detergent alkylate, and heavy alkylate separated the detergent alkylate being distilled over under reduced pressure. The detergent alkylated product was taken as the fraction boiling within the range 295–305° C./760 mm. The yield of detergent alkylate was 122 parts by weight per 100 parts of dodecene used, 4 parts of light alkylated and 16 parts of heavy alkylate also being obtained.

*Example 14*

This example illustrates the preparation of detergent alkylate by alkylating an aromatic hydrocarbon with an olefin in the carbon number range 10 to 16 obtained by dimersing an olefin in the carbon number range $C_5$ to $C_8$ over a silica/alumina catalyst.

An alkylation using the conditions described in Example 13 was carried out using the $C_{12}$ product from a normal hexene dimerisation on silica/alumina catalyst. This gave a yield of detergent alkylate of boiling range 255–303° C./760 mm. of 129 parts by weight per 100 parts by weight of olefin, with 6 parts of light alkylate and 8 parts of residual heavy alkylate.

*Example 15*

This example illustrates the preparation of detergent alkylate by alkylation of an aromatic hydrocarbon with a dimer of an olefin in the carbon number range $C_5$ to $C_8$.

A dimer of hexene-1 prepared by conventional Ziegler catalyst dimerisation was alkylated as in Example 13. A yield of 120 parts of detergent alkylated (boiling range 287–300° C.) per 100 parts of olefin was obtained, with 5 parts of light alkylate and 19 parts of heavy alkylate.

It will be realised that only hexene-1 reacts is convention Ziegler type dimerisation, any hexene-2 and hexene-3 present remaining unreacted. A separate or concurrent double bond isomerisation of the internal olefins is therefore necessary in this case to make full of the olefins prepared from the sulphonic acids, which contain large amounts of internal olefins.

We claim:

1. A process for the production of olefines which comprises thermally decomposing an alkane sulphonic acid selected from the group consisting of (1) alkane sulphonic acids of the formula

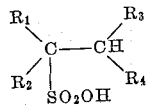

where $R_1$, $R_2$, $R_3$ and $R_4$ are selected from the group consisting of hydrogen, alkyl and aryl radicals and (2) alkane sulphonic acids of the formula

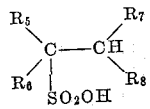

where a member of the group consisting of $R_5$ and $R_6$ and a member of the group consisting of $R_7$ and $R_8$ form part of the same cycloaliphatic ring, the remaining member in each group being selected from the group consisting of hydrogen alkyl and aryl.

2. A process according to claim 1 in which the alkane sulphonic acids are derivatives of paraffins selected from the group consisting of paraffins having from 4 to 20 carbon atoms in the molecule and mixtures of such paraffins.

3. A process according to claim 2 in which the paraffins are straight chain paraffins.

4. A process according to claim 1 in which the alkane sulphonic acid is substantially free from sulphuric acid.

5. A process according to claim 1 in which the alkane sulphonic acid is fed to the thermal decomposition step in aqueous solution.

6. A process as claimed in claim 1 in which the thermal decomposition is carried out at a temperature such that the olefine produced is in the vapor phase.

7. A process according to claim 5 in which an aqueous solution of alkane sulphonic acid is injected into a hot reaction zone containing steam or an inert gas heated to the decomposition temperature.

8. A process according to claim 1 in which the alkane sulphonic acid is thermally decomposed to an olefin by heating to a temperature in the range 300°–800° C.

9. A process according to claim 5 in which the alkane sulphonic acid is thermally decomposed to an olefin in the presence of an inert solid.

10. A process according to claim 9 in which the inert solid is silica.

11. A process according to claim 9 in which the inert solid is alumina with a surface area of not more than 10 m.²/gm.

12. In a process for the production of an alkyl aryl compound from an aromatic hydrocarbon by alkylation, in the presence of an alkylation catalyst, with an olefin, the improvement which comprises preparing the olefin from a paraffin by a method which comprises the steps of forming an alkane sulphonic acid of the formula

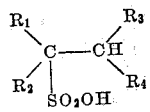

where $R_1$, $R_2$, $R_3$ and $R_4$ are hydrogen, alkyl or aryl, and thermally decomposing the alkane sulphonic acid to obtain an olefin and sulphur dioxide.

13. In a process for the production of detergent alkylate which comprises alkylating an aromatic hydrocarbon in the presence of an alkylation catalyst, with an olefin which will give detergent alkylate and recovering the alkylate produced, the improvement which comprises preparing the olefin from a paraffin by a method which comprises the steps of forming an alkane sulphonic acid of the formula:

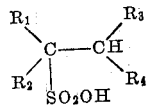

wherein $R_1$, $R_2$, $R_3$ and $R_4$ are hydrogen, alkyl or aryl, and thermally decomposing the alkane sulphonic acid to obtain an olefin and sulphur dioxide.

14. In a process for the production of detergent alkylate which comprises alkylating an aromatic hydrocarbon in the presence of an alkylation catalyst with an olefin which will give detergent alkylate and recovering the alkylate produced, the improvement which comprises sulfoxidizing a $C_{10}$ to $C_{17}$ paraffin feed stock containing at least 95% of normal paraffin to obtain alkane sulfonic acids and thermally decomposing the alkane sulfonic acids to obtain such olefin and sulphur dioxide.

15. In a process for the production of detergent alkylate which comprises alkylating an aromatic hydrocarbon in the presence of an alkylation catalyst with an olefin which will give detergent alkylate and recovering the alkylate produced, the improvement which comprises sulfoxidizing a $C_5$ to $C_8$ paraffin feed stock containing at least 95% of normal paraffins to obtain alkane sulfonic acids, thermally decomposing the alkane sulfonic acids to obtain $C_5$ to $C_8$ normal olefins and sulphur dioxide and dimerizing the $C_5$ to $C_8$ olefins in the presence of a dimerization catalyst.

References Cited

UNITED STATES PATENTS

| 2,718,526 | 9/1955 | Mammen | 260—671 X |
| 3,214,462 | 10/1965 | Swenson et al. | 260—671 X |
| 3,238,249 | 3/1966 | Mirviss et al. | 260—671 X |

FOREIGN PATENTS

| 852,079 | 10/1960 | Great Britain. |
| 910,540 | 11/1962 | Great Britain. |
| 913,795 | 12/1962 | Great Britain. |

DELBERT E. GANTZ, *Primary Examiner.*

C. R. DAVIS, *Assistant Examiner.*